US010235295B1

(12) United States Patent
Akhter

(10) Patent No.: US 10,235,295 B1
(45) Date of Patent: Mar. 19, 2019

(54) SCALABLE COHERENT APPARATUS AND METHOD

(71) Applicant: Integrated Device Technology, Inc., San Jose, CA (US)

(72) Inventor: Mohammad Shahanshah Akhter, Ottawa (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 35 days.

(21) Appl. No.: 15/247,854

(22) Filed: Aug. 25, 2016

Related U.S. Application Data

(60) Provisional application No. 62/209,879, filed on Aug. 25, 2015.

(51) Int. Cl.
*G06F 12/08* (2016.01)
*G06F 12/0873* (2016.01)
*G06F 13/16* (2006.01)
*G06F 9/46* (2006.01)

(52) U.S. Cl.
CPC .......... *G06F 12/0873* (2013.01); *G06F 9/467* (2013.01); *G06F 13/1689* (2013.01); *G06F 2212/604* (2013.01); *G06F 2212/608* (2013.01)

(58) Field of Classification Search
CPC ...... G06F 12/08; G06F 12/0873; G06F 9/467; G06F 13/1689

USPC .................................................. 711/141, 203
See application file for complete search history.

(56) References Cited

U.S. PATENT DOCUMENTS

| | | | |
|---|---|---|---|
| 9,379,980 B1 * | 6/2016 | Hedinger | G06F 13/00 |
| 2010/0014487 A1 * | 1/2010 | Attar | H04J 9/00 370/335 |
| 2014/0006644 A1 * | 1/2014 | Pullagoundapatti | G06F 12/0284 710/4 |
| 2017/0192689 A1 * | 7/2017 | Gaikwad | G06F 3/0608 |

FOREIGN PATENT DOCUMENTS

| | | | | |
|---|---|---|---|---|
| EP | 1085425 A2 * | 3/2001 | | G06F 9/44505 |
| WO | WO-0129674 A1 * | 4/2001 | | G06F 12/082 |

* cited by examiner

*Primary Examiner* — Pierre Miche Bataille
(74) *Attorney, Agent, or Firm* — Heimlich Law, PC; Alan Heimlich, Esp.

(57) ABSTRACT

Scalable Coherent Apparatus and Method have been disclosed. In one implementation a dual directory approach is used to implement scalable coherent accesses in a heterogeneous system. A transaction identification mapping for coherent RapidIO memory transactions between a plurality of external hardware processing elements is used. Source transaction identification encoding is a combination of bits from two advanced extensible interface identifications. Target transaction identification is decoded into a combination of bits for two advanced extensible interface identifications.

9 Claims, 17 Drawing Sheets

702 Field Definitions and Encodings for All Response Packets

| Field 710 | Encoding 720 | Sub-Field 730 | Definitions 750 |
|---|---|---|---|
| transaction 711 | 0b0000 741 | | RESPONSE transaction with no data payload 751 |
| | 0b0001–0111 742 | | Reserved 752 |
| | 0b1000 743 | | RESPONSE transaction with data payload 753 |
| | 0b1001–1111 744 | | Reserved 754 |
| targetTID 712 | — 745 | | The corresponding request packet's transaction ID 755 |
| status 762 | | Type of status and encoding 764 | |
| | 0b0000 770 | DONE 771 | Requested transaction has been successfully completed 772 |
| | 0b0001 773 | DATA_ONLY 774 | This is a data only response 775 |
| | 0b0010 776 | NOT_OWNER 777 | Not owner of requested coherence granule 778 |
| | 0b0011 779 | RETRY 780 | Requested transaction is not accepted; must retry the request 781 |
| | 0b0100 782 | INTERVENTION 783 | Update home memory with intervention data 784 |
| | 0b0101 785 | DONE_INTERVENTION 786 | Done for a transaction that resulted in an intervention 787 |
| | 0b0110 788 | — 789 | Reserved 790 |
| | 0b0111 791 | ERROR 792 | Uncorrectable error detected 793 |
| | 0b1000–1011 794 | — 795 | Reserved 796 |
| | 0b1100–1111 797 | Implementation 798 | Implementation defined—Can be used for additional information such as an error code 799 |

FIG. 7

| Features | ARM AMBA4 ACE | Coherency extension off-chip |
|---|---|---|
| Specification Version | AMBA4 ACE and ACE-Lite (22 Feb 2013, Issue E) AMBA4 ACE is primary target ACE Lite (for I/O device) is subset of ACE | Based on RapidIO GSM Logical Transport and PHY Specification (Version 3.0, Oct 2013) |
| Architecture | CC-NUMA | CC-NUMA |
| Coherency State Model | 5 State Coherency Model Others possible | 3-State Coherency Model Mapping option 1; no change 3 state model Option 2-4 state model extended using state encoding |
| Granularity | Cache Line and Large Buffer Granularity Others Possible 64-byte (baseline) | Cache Line Granularity Others possible 64-byte (baseline) |
| Protocol | Various options Snoop Snoop Filter Directory | Two directory model |
| Endianess | Little Endian | Utilize Big endian, 64-bit aligned |
| TLB Sync | Use Distributed Virtual Memory paradigm (DVM) | TLB mapping based baseline RapidIO protocol |
| Ordering/QoS | Ordering: AXI ID QoS: AWQoS and ARQoS | Map to (e.g. src/traget TID) Transaction ID Use PHY (PRIO, CRF) and GSM reserved packet format for flow control/QoS Control |

FIG. 17

SCALABLE COHERENT APPARATUS AND METHOD

RELATED APPLICATION

The present Application for Patent claims priority to U.S. Patent Application No. 62/209,879 titled "Scalable Coherent Apparatus and Method" filed Aug. 25, 2015, and which is hereby incorporated herein by reference.

FIELD OF THE INVENTION

The present invention pertains to a scale-out systems and method. More particularly, the present invention relates to Scalable Coherent Apparatus and Method.

BACKGROUND OF THE INVENTION

There are serious limitations on maintaining coherency in heterogeneous systems.

This presents a technical problem for which a technical solution using a technical means is needed.

BRIEF DESCRIPTION OF THE DRAWINGS

The invention is illustrated by way of example and not limitation in the figures of the accompanying drawings.

FIG. 7 illustrates, generally at 700, one embodiment showing Field Definitions and Encoding for All Response Packets.

FIG. 17 illustrates, generally at 1700, a summary showing were embodiments are used.

DETAILED DESCRIPTION

Figure 1:
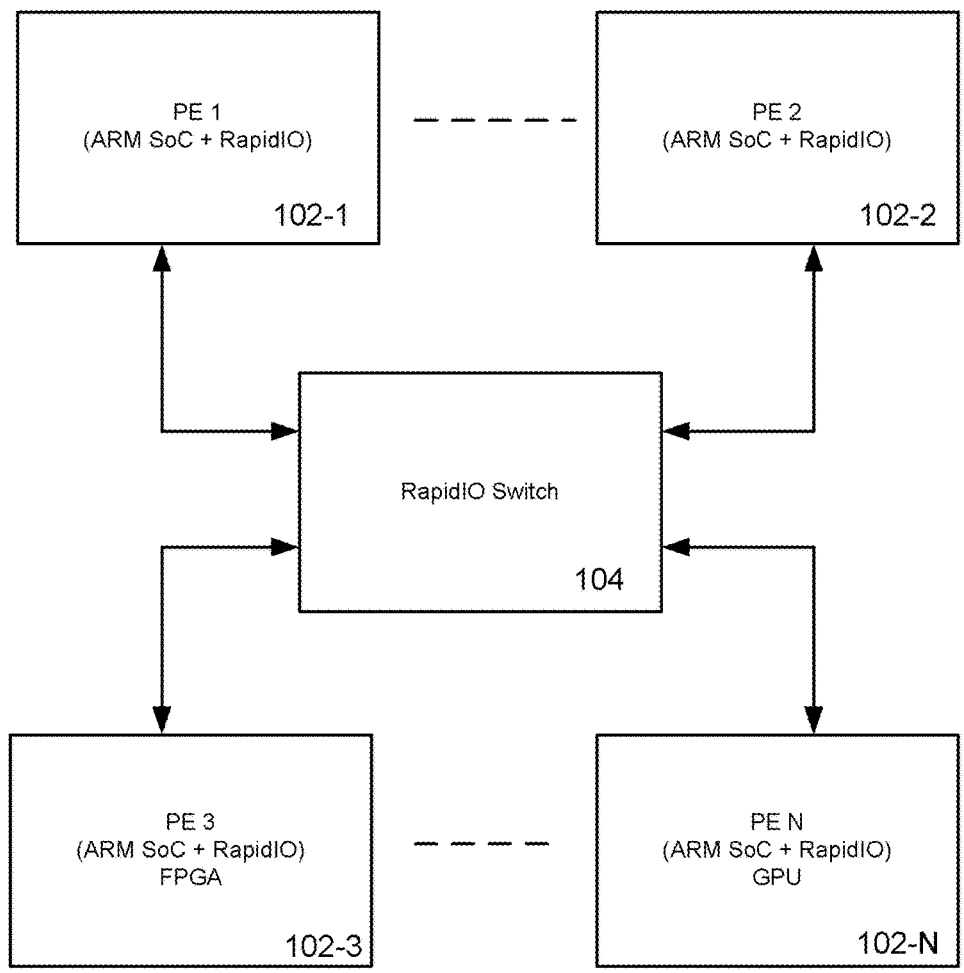
FIG. 1 illustrates, generally at 100, one embodiment showing an architecture for processing elements (PE).

While embodiments of the invention infra utilize ARM for illustrative purposes, any computer architecture, such as but not limited to, x86, x64, AMD, PowerPC, etc. may be used.

In one embodiment the invention works with any computer architecture.

In one embodiment the invention uses a dual directory based coherency mapping method to support a scalable computer based heterogeneous system.

In one embodiment the invention uses a dual directory based coherency mapping method to support a scalable ARM based heterogeneous system.

In one embodiment the invention uses a dual directory based coherency mapping method to support scale-out to a large number of nodes with low latency (e.g. via a high speed low latency interface, such as but not limited to, RapidIO).

In one embodiment the invention supports heterogeneous low energy architecture where computing is performed across diverse processing elements by making it possible to share and access data in a coherent manner among these elements thereby leading to an energy efficient scale-out system using a standardized communication semantics. Such multiple heterogeneous processing elements involve GPU, FPGA, and computer (e.g. ARM, x86, PowerPC, etc) based architectures.

In one embodiment the invention enables coherent communication between multiple heterogeneous computing elements with low latency for ARM based scale-out systems involving GPU and FPGA. Specifically, a coherent communication protocol mapping is disclosed that can be used in parallel to state-of-the-art non-coherent protocols to build energy efficient systems based on two level directory/snoop filters on ARM based SoC. Although the discussion is shown around ARM ACE, this can be applied to ARM CHI protocol as well.

In one embodiment of the invention the techniques disclosed can be implemented in next generation ARM based devices/SoCs/Systems/Interconnects which will cover a range of markets such as big data analytics, IoT (Internet of Things), Access network, Security and Video analytic systems, mobile devices, etc.

Heterogeneous low energy architecture is expected to become the cornerstone of the next generation computing. As computing is performed across diverse processing elements, it is necessary to share and access data in a coherent manner among these elements to develop a energy efficient scale-out system using a standardized communication semantics. Such an approach is disclosed herein.

For example, state-of-the-art energy efficient ARM based computing and storage systems do not have a communication protocol that enables low latency coherent communication across multiple heterogeneous processing elements involving GPU, FPGA, and ARM based architectures. The approach described herein allows for these features.

The techniques disclosed enables coherent communication between multiple heterogeneous computing elements with low latency, for example, for ARM based scale-out systems involving GPU and FPGA. A coherent communication protocol mapping is discussed that can be used in parallel to state-of-the-art non-coherent protocols to build an energy efficient system based on two level directory/snoop filters on, for example, an ARM based SoC.

Although the illustrative discussion is shown around ARM ACE, this can be applied to ARM CHI protocol.

FIG. 1 illustrates, generally at 100, one embodiment showing an architecture for processing elements (PE). There are a plurality (N) of Processing Elements (PE), PE 1 102-1, PE 2 102-2, PE 3 102-3, ..., PE N 102-N, which in this illustration each have an ARM SoC and a RapidIO on each PE. The Processing Elements (PE), PE 1 102-1, PE 2 102-2, PE 3 102-3, ..., PE N 102-N are each connected to RapidIO Switch 104. This allows any PE to communication to any other PE.

However the invention is not so limited and in one embodiment the architecture of FIG. 1 can handle multiple processing elements that are connected with RapidIO. Further in one embodiment, the Processing Elements can be based on any processing element, for example, but not limited to ARM, a GPU (Graphics Processing Unit), or FPGAs (Field Programmable Gate Arrays) with or without, for example, integrated ARM Cores In the embodiment as illustrated in FIG. 1 the PEs incorporate the disclosed coherent and non-coherent protocol. In one embodiment, the disclosed approach can be used with any SoC that incorporates, for example, AMBA ACE or CHI coherent on-chip protocol.

Figure 2:
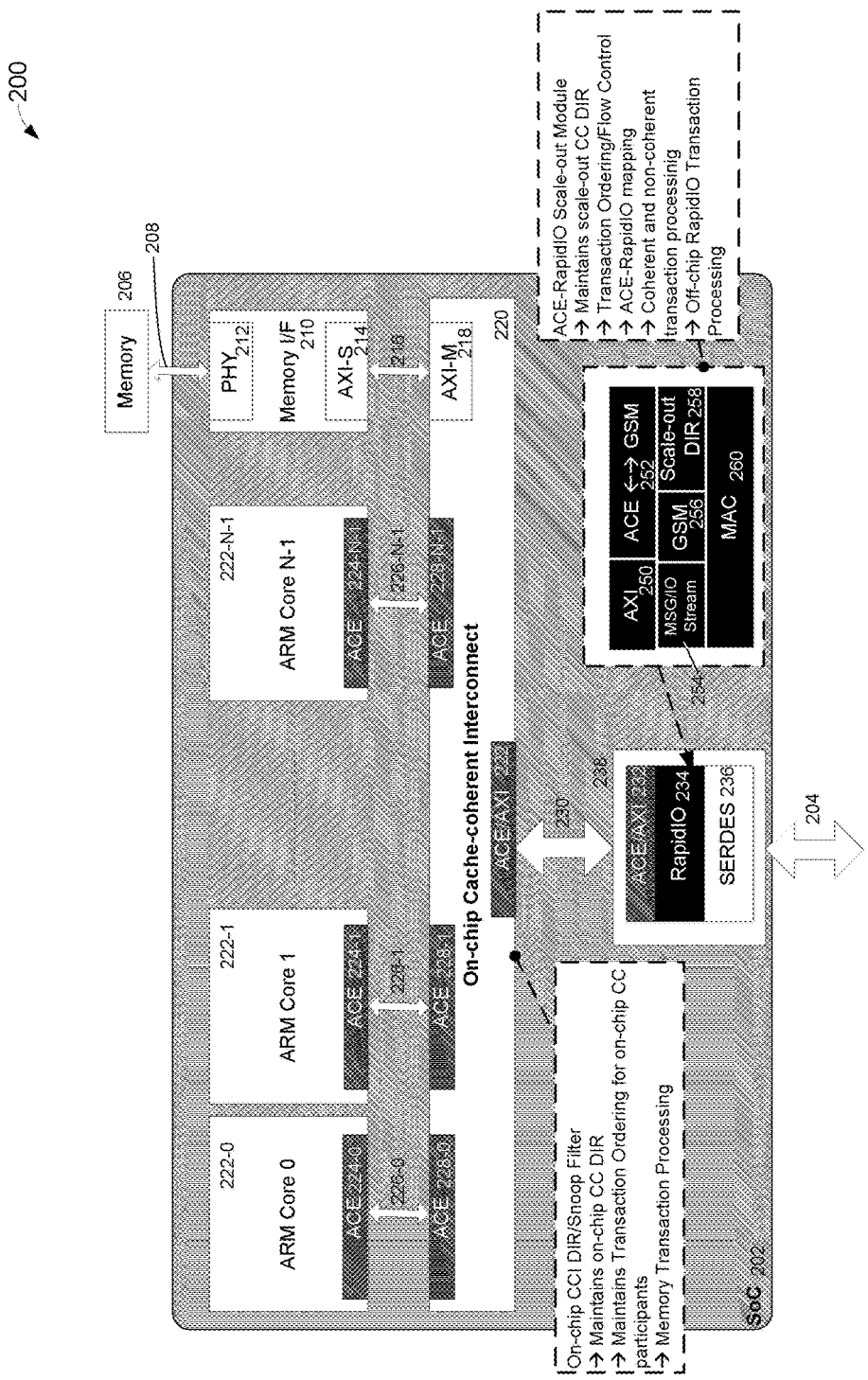
FIG. 2 illustrates, generally at 200, one embodiment showing a block diagram of a specialized hardware system as a system on a chip (SOC).

FIG. 2 illustrates, generally at 200, one embodiment showing a block diagram of a specialized hardware system as a system on a chip (SoC). For example, in one embodiment, SoC 202 is representative of one or more of FIG. 1 Processing Elements (e.g. PE 1 to PE N). SoC 202 has a variety of interfaces including interface links 204 and 208. SoC 202 has N ARM Cores as shown at 222-0, 222-1, ..., 222-N-1. Associated respectively with each ARM Cores is ACE (224-0, 224-1, ..., 224-N-1) and a link (226-0, 226-1, ..., 226-N-1). The links (226-0, 226-1, ..., 226-N-1) interface respectively with ACE 228-0, 228-1, ..., 228-N-1 which are part of On-chip Cache-coherent Interconnect 220. On-chip Cache-coherent Interconnect 220 also has AXI-M 218 which communicates with link 216 to Memory I/F (InterFace) 210. Memory I/F 210 has an AXI-S 214 which communicates with link 216. PHY 212, which is part of Memory I/F 210, communicates via link 208 with Memory 206. On-chip Cache-coherent Interconnect 220 also has ACE/AXI 222 which communicates with link 230 to block 238. Block 238 has an ACE/AXI 234 which communicates with RapidIO 234 which communicates with SERDES 236 which communicates via link 204.

RapidIO 234, as shown by the dashed lines, is composed of major blocks AXI 250, ACE←→GSM 252, MSGI/O Stream 254, GSM 256, Scale-out DIR 258, and MAC 260. As noted RapidIO 234 is part of the ACE-RapidIO Scale-out Module and, for example, Maintains scale-out CC DIR, handles Transaction Ordering/Flow Control, does ACE-RapidIO mapping, handles Coherent and non-coherent transaction processing and handles Off-chip RapidIO Transaction Processing.

On-chip Cache-coherent Interconnect 220, as noted by the dashed box connected to On-chip Cache-coherent Interconnect 220, illustrates some of the functionality of On-chip Cache-coherent Interconnect 220 including, but not limited to, On-chip CCI DIR/Snoop Filtering, maintaining on-chip CC DIR, maintaining Transaction Ordering for on-chip CC participants, and Memory Transaction Processing.

In one embodiment, for example, as illustrated in FIG. 2, the SOC architecture provides the following features. It implements coherency extension based on dual directory based on LUT (Look Up Table). It has a First Directory where this first directory cache coherent directory is implemented within on-chip Cache coherent fabric to track coherency between on-chip cores. The first directory supports, among other things, the following functions: maintains on-chip CC directory to keep track of cache lines and states; maintains transaction ordering for no-chip CC participants; and performs memory transaction processing. It has a Second Directory where this second directory Cache coherent directory is implemented on-chip SoC in the ACE-RapidIO Scale-out module to keep track of the participating SoCs in the system. The ACE-RapidIO Scale-out module supports, among other things, the following functions: maintains scale-out CC Directory for participating processing elements (SoCs); performs transaction ordering and flow control; processes both coherent and non-coherent transactions, and performs ACE-RapidIO mapping.

Figure 3:
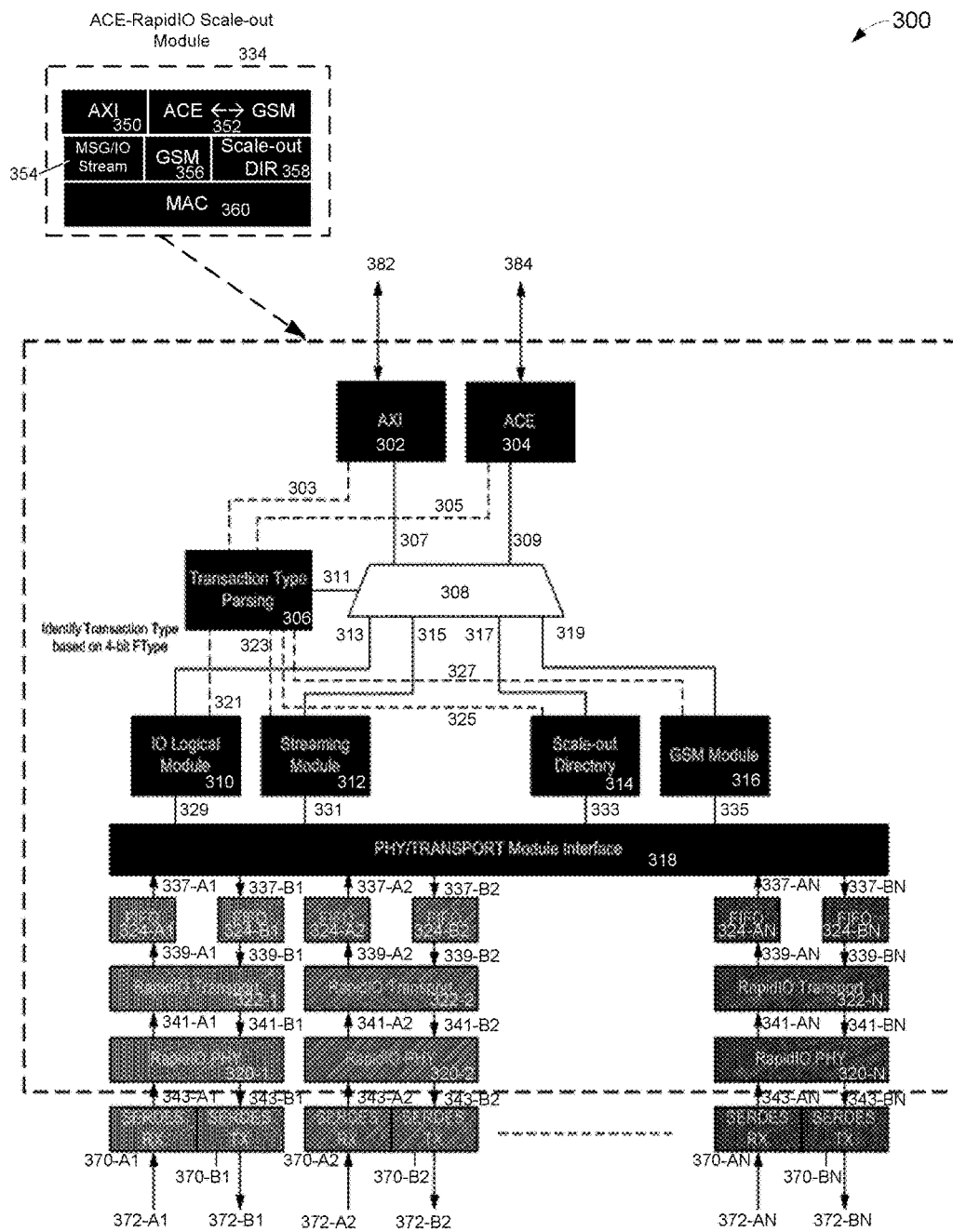
FIG. 3 illustrates, generally at 300, one embodiment showing a block diagram of an ACE-RapidIO Scale-out Module

FIG. 3 illustrates, generally at 300, one embodiment showing a block diagram of an ACE-RapidIO Scale-out Module 334. ACE-RapidIO Scale-out Module 334 has major blocks AXI 350, ACE←→GSM 352, MSGI/O Stream 354, GSM 356, Scale-out DIR 358, and MAC 360. In one embodiment, ACE-RapidIO Scale-out Module 334, among other things, maintains scale-out CC DIR, handles Transaction Ordering/Flow Control, does ACE-RapidIO mapping, handles Coherent and non-coherent transaction processing and handles Off-chip RapidIO Transaction Processing.

In one embodiment ACE-RapidIO Scale-out Module 334 has link 382 which interfaces to AXI 302, link 384 which interfaces to ACE 304. AXI 302 interfaces to block 308 via link 307. ACE 304 interfaces to block 308 via link 309. AXI 302 interfaces to Transaction Type Parsing block 306 via link 303. ACE 304 interfaces to Transaction Type Parsing block 306 via link 305. Transaction Type Parsing block 306 via link 311 is in communication with block 308. Block 308 communicates via links 313, 315, 317, and 319 respectively with IP Logical Module 310, Streaming Module 312, Scale-out Directory 314, and GSM Module 316. Transaction Type Parsing block 306 communicates via links 321, 323, 325, and 327 respectively with IP Logical Module 310, Streaming Module 312, Scale-out Directory 314, and GSM Module 316. IP Logical Module 310, Streaming Module 312, Scale-out Directory 314, and GSM Module 316 communicate via links 329, 331, 333, and 335 respectively with PHY/TRANSPORT Module Interface 318.

PHY/TRANSPORT Module Interface 318 communicates with N interfaces via links 337-A1, 337-B1, 337-A2, 337-B2, ..., 337AN, 337BN which respectively to FIFO (First In First Out) 324-A1, FIFO 324-B1, FIFO 324-A2, FIFO 324-B2, ..., FIFO 324AN, FIFO 324BN. FIFO 324-A1 and FIFO 324-B1 communicate respectively via links 339-A1 and 339-B1 to RapidIO Transport 322-1. FIFO 324-A2 and FIFO 324-B2 communicate respectively via links 339-A2 and 339-B2 to RapidIO Transport 322-2. FIFO 324-AN and FIFO 324-BN communicate respectively via links 339-AN and 339-BN to RapidIO Transport 322-N. RapidIO Transport 322-1 communicates via links 341-A1 and 341-B1 with RapidIO PHY 320-1. RapidIO Transport 322-2 communicates via links 341-A2 and 341-B2 with RapidIO PHY 320-2. RapidIO Transport 322-N communicates via links 341-AN and 341-BN with RapidIO PHY 320-N. RapidIO PHY 320-1 via links 343-A1 and 343-B1 can communicate beyond ACE-RapidIO Scale-out Module 334 by interfacing, for example, to respectively, SERDES RX 370-A1 and SERDES TX 370-B1, which in turn respectively connect to link 372-A1 and 372-B1. RapidIO PHY 320-2 via links 343-A2 and 343-B2 can communicate beyond ACE-RapidIO Scale-out Module 334 by interfacing, for example, to respectively, SERDES RX 370-A2 and SERDES TX 370-B2, which in turn respectively connect to link 372-A2 and 372-B2. RapidIO PHY 320-N via links 343-AN and 343-BN can communicate beyond ACE-RapidIO Scale-out Module 334 by interfacing, for example, to respectively, SERDES RX 370-AN and SERDES TX 370-BN, which in turn respectively connect to link 372-AN and 372-BN.

In one embodiment, Transaction Type Parsing block 306 identifies Transaction Type based on 4-bit FType.

In one embodiment, for example, as illustrated in FIG. 3, the ACE-RapidIO Scale-out Module 334 supports both coherent and non-coherent transactions. In one embodiment, the Transaction Parsing Module (TPM) (e.g. Transaction Type Parsing 306) in the RapidIO Scale-out Module 334 parses the incoming and the outgoing transactions to identify specific transaction types. In one embodiment, specific transaction types (coherent versus non-coherent) are identified based on the FType field in the RapidIO packets while receiving packets from the RapidIO interface. In one embodiment, specific transaction types (coherent versus non-coherent) are identified based on specific signaling on the AXI4 channels and ACE-specific channels and acknowledge signaling while forwarding packet towards the RapidIO interface.

Figure 4:
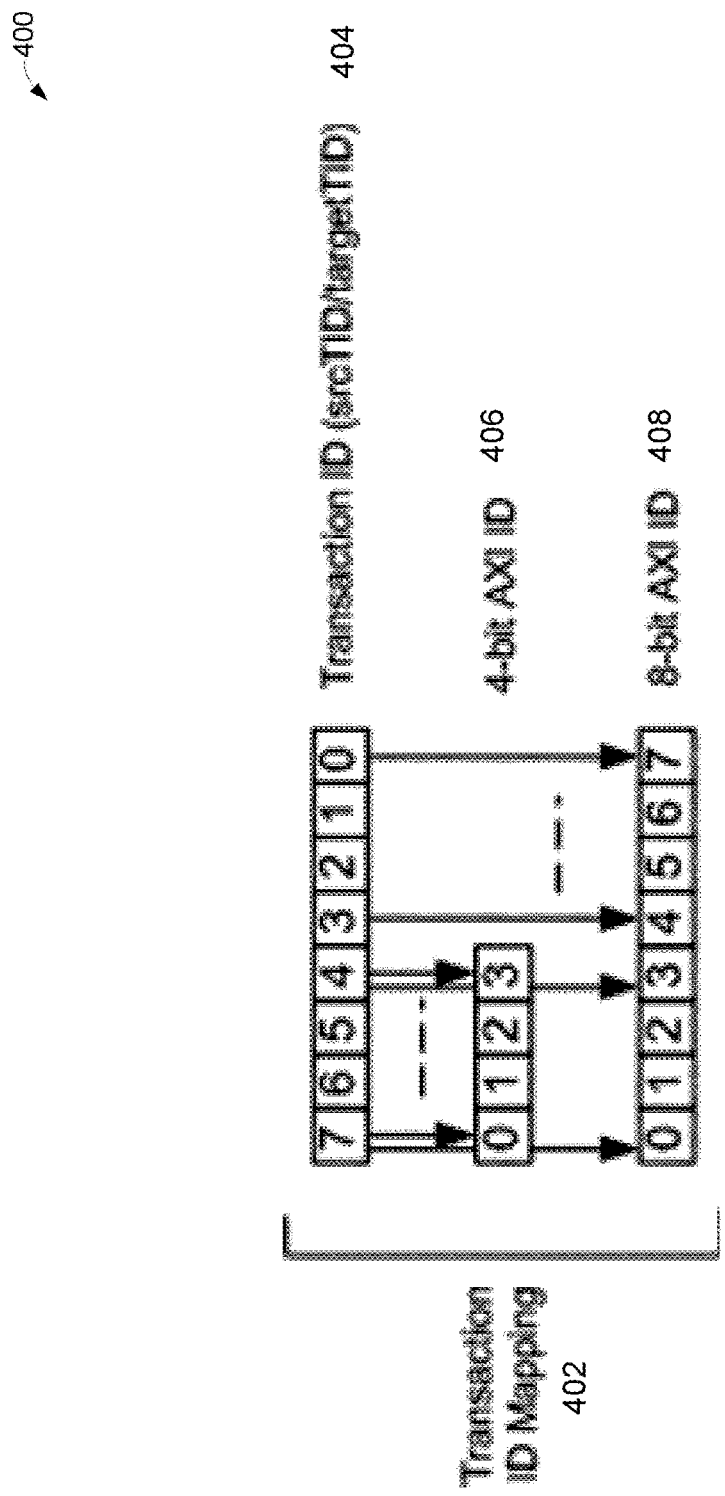
FIG. 4 illustrates, generally at 400, one embodiment showing a Transaction ID Mapping.

FIG. 4 illustrates, generally at 400, one embodiment showing a Transaction ID Mapping. At 402 is Transaction ID Mapping, at 404 Transaction ID (srcTID/targetTID), at 406 4-bit AXI ID, and at 408 8-bit AXI ID.

Figure 5:
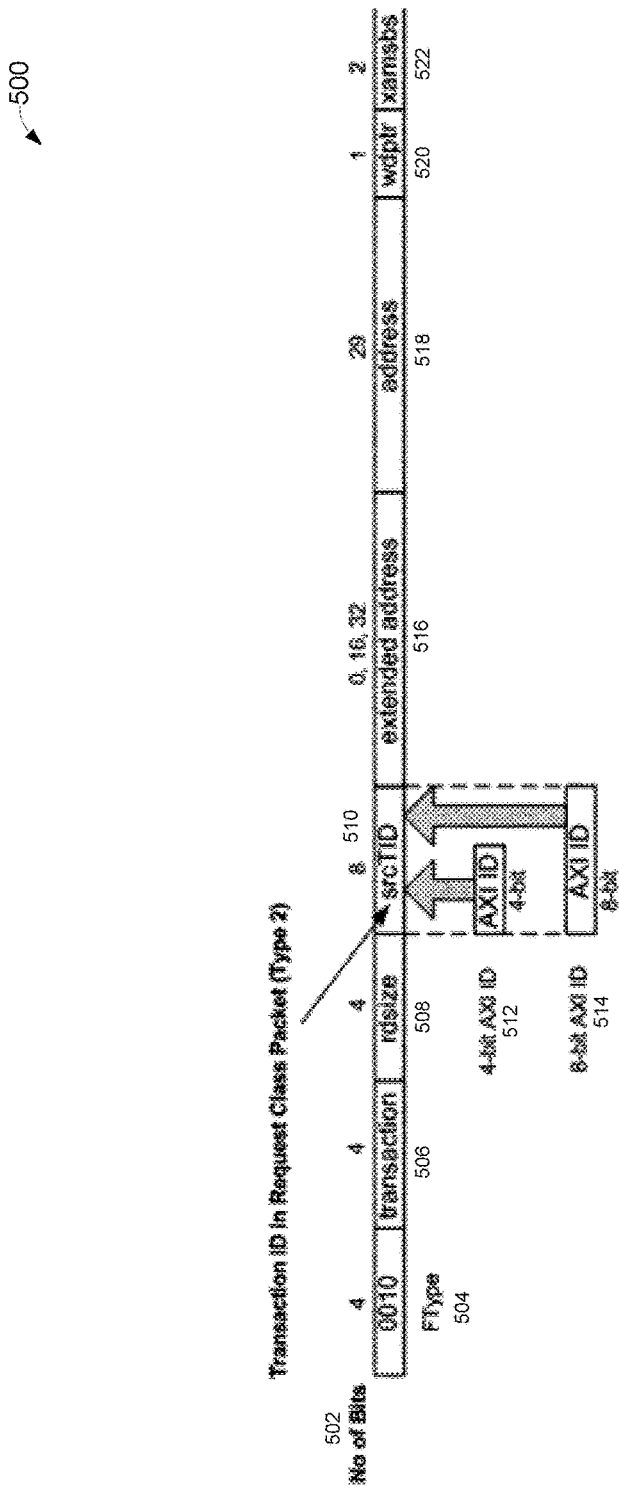
FIG. 5 illustrates, generally at 500, one embodiment showing a bit arrangement (Type 2).

FIG. 5 illustrates, generally at 500, one embodiment showing a bit arrangement (Type 2). At 502 is shown the number of bits in each field (e.g. 504, 506, 508, 510, 516, 518, 520, 522). At 504 is 4-bit field FType, here showing 0010. At 506 is 4-bit field transaction. At 508 is 4-bit field rdsize. At 510 is 8-bit field srcTID which is derived from 512 4-bit AXI ID and 514 8-bit AXI ID. At 516 is field extended address that can be of variable size, for example, but not limited to 0, 16, 32 bits. At 518 is 29-bit field address. At 520 is 1-bit field wdptr. At 522 is 2-bit field xamsbs. As illustrated at 510 srcTID is Transaction ID In Request Class Packet (Type 2).

Figure 6:
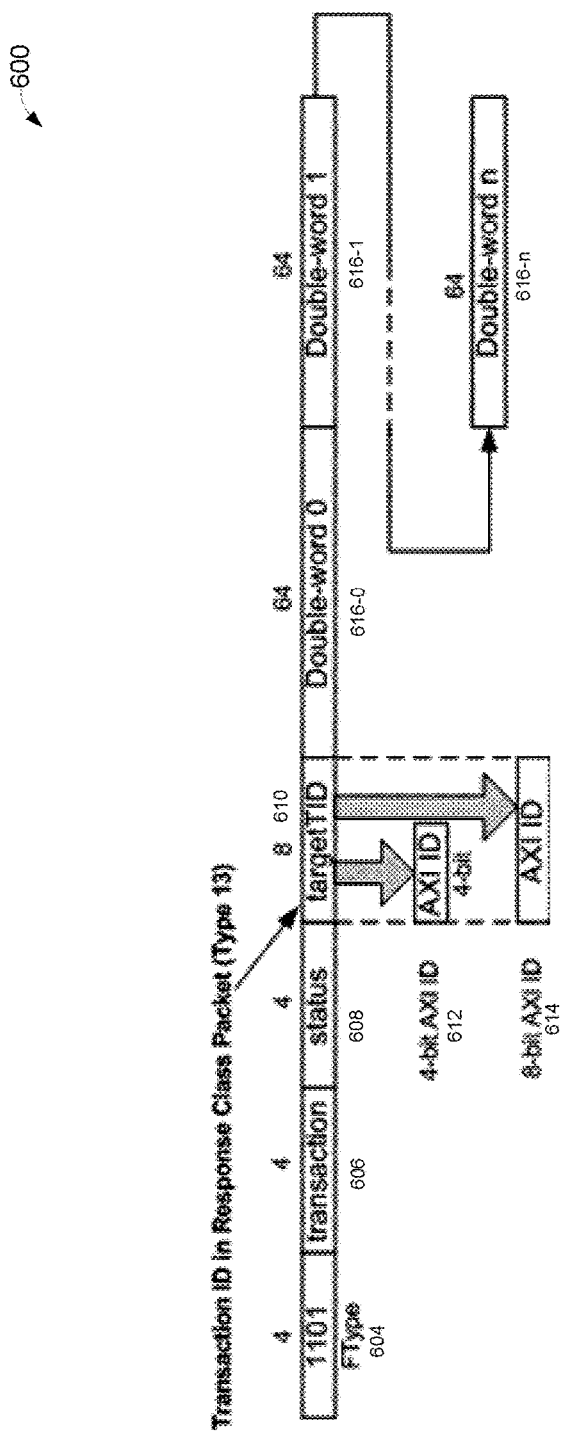
FIG. 6 illustrates, generally at 600, one embodiment showing a bit arrangement (Type 13).

FIG. 6 illustrates, generally at 600, one embodiment showing a bit arrangement (Type 13). At 604 is 4-bit field FType, here showing 1101. At 606 is 4-bit field transaction. At 608 is 4-bit field status. At 610 is 8-bit field targetTID which is yields from 612 4-bit AXI ID and 614 8-bit AXI ID. At 616-0 is field 64-bits Double-word 0, at 616-1 field 64-bits Double-word 1, continuing to n 64-bit double words as denoted by 616-n field 64-bits Double-word n.

FIG. 4, FIG. 5, and FIG. 6 disclose Transaction ID Mapping. In one embodiment, the AXI ID field is mapped to the 8-bit transaction ID that is unique for a requestor-responder (srcTID/targetTID) processing element pair in the ACE-RapidIO scale-out module. The transaction id is used by the responder to easily match the response to the original request.

FIG. 4, FIG. 5, and FIG. 6 show embodiments of a mapping scheme for Request Class (type 2) and Response class (Type 13). It is also possible to use similar mapping for other request and response class. Transaction ID mapping is shown for both 4-bit and 8-bit AXI ID. In one embodiment the Mapping table is implemented based on registers or a LUT FIG. 7 illustrates, generally at 700, one embodiment showing Field Definitions and Encoding for All Response Packets. At 702 is Field Definitions and Encoding for All Response Packets as shown in table 704 and table 760. At 714 is shown a subset that be indicated in another figure. At 710 is the Field, such as 711 transaction, 712 targetTID, 762 status. At 720 is Encoding, at 730 is Sub-Field, such as 741 through 745. At 750 is Definition, such as, 751 through 755.

At 764 is Type of status and encoding, for example 771 has 0b0000, 772 indicates DONE, and 773 indicated Requested transaction has been successfully completed. Other Type of status and encoding are as shown at groups 770 771 772; 773 774 775; 776 777 778; 779 780 781; 782 783 784; 785 786 787; 788 789 790; 791 792 793; 794 795 796; 797 798 799.

Figure 8:
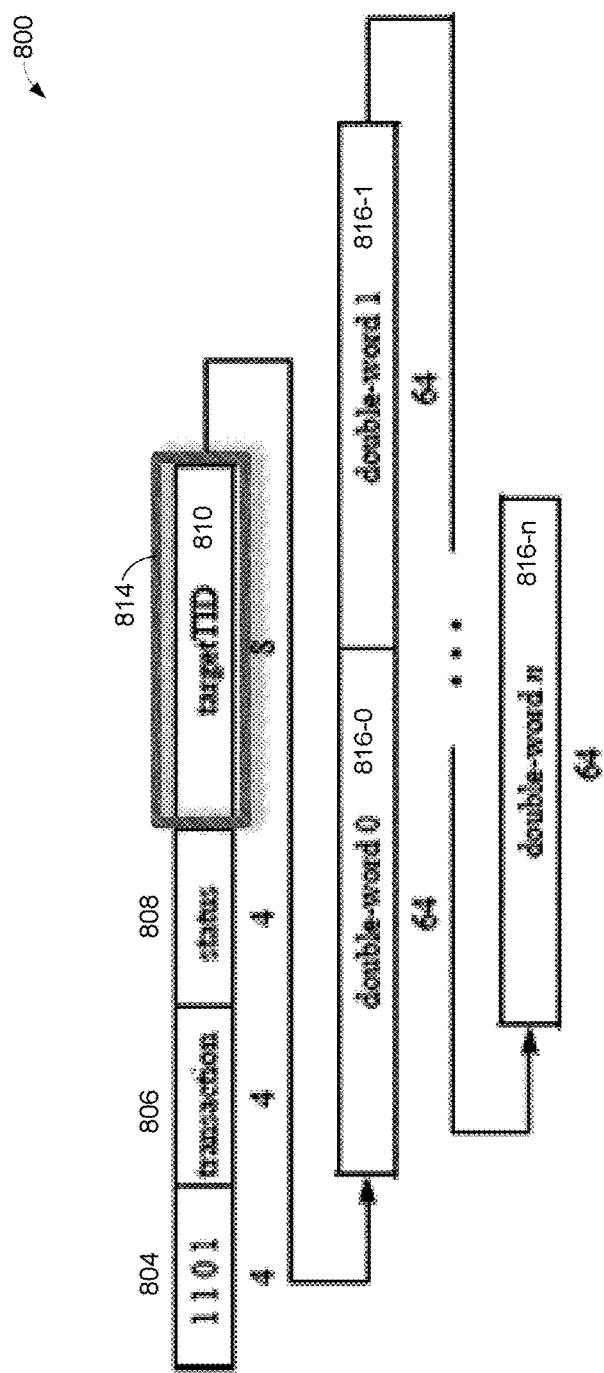
FIG. 8 illustrates, generally at 800, one embodiment showing Type 13 Packet Bit Stream Format.

FIG. 8 illustrates, generally at 800, one embodiment showing Type 13 Packet Bit Stream Format. At 804 is 4-bit field showing 1101, at 806 is 4-bit field transaction. At 808 is 4-bit field status. At 810 is 8-bit field targetTID (where 814 denotes a FIG. 7 714 entry). At 816-0 is field 64-bits double-word 0, at 816-1 field 64-bits double-word 1, continuing to n 64-bit double words as denoted by 816-n field 64-bits double-word n.

FIG. 7 and FIG. 8 illustrate an example ID in Response Packet Format. As shown is a Response Packet Format for all requests. In particular a Type 13→RESPONSE is shown.

Figure 9:
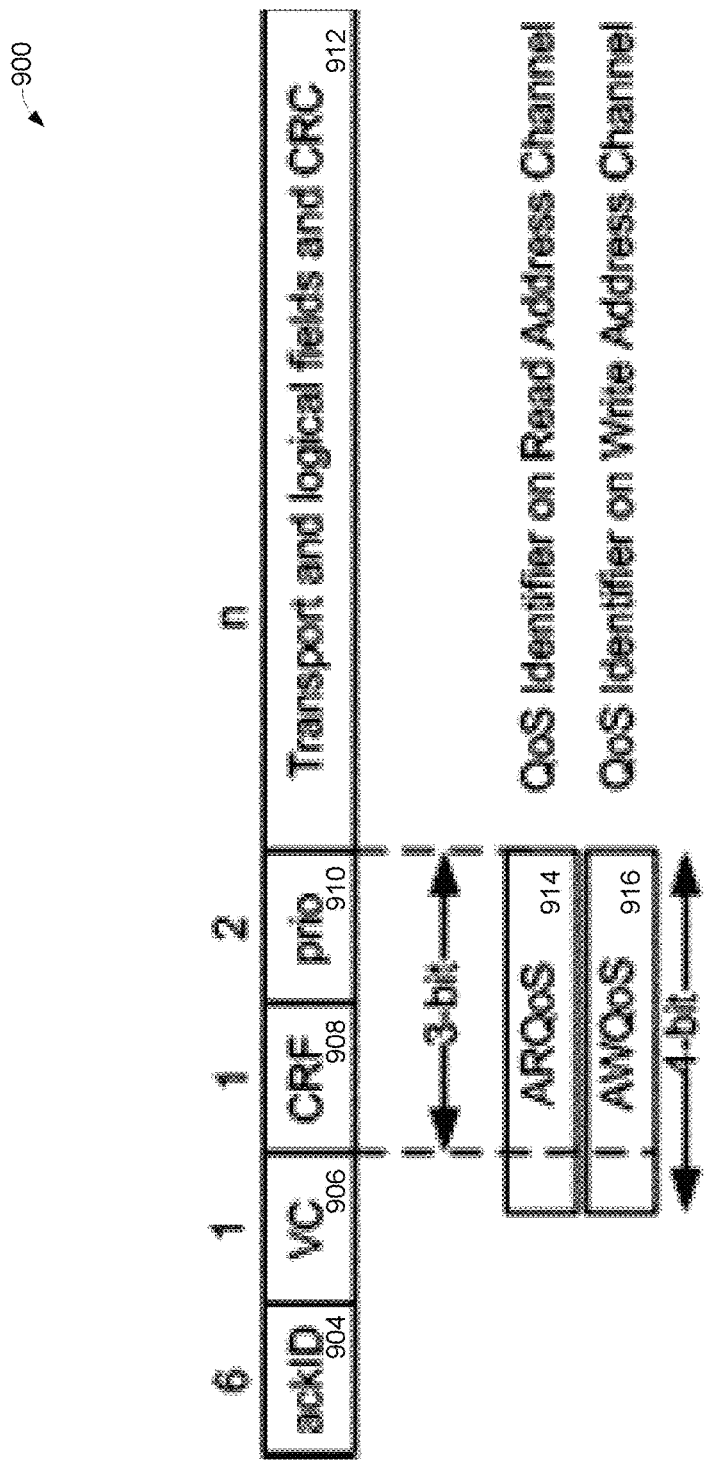
FIG. 9 illustrates, generally at 900, one embodiment showing a QoS mapping.

FIG. 9 illustrates, generally at 900, one embodiment showing a QoS mapping. At 904 is a 6-bit field acklDm at 906 a 1-bit field VC, at 908 a 1-bit field CRF, ad 910 a 2 bit field prio, and at 912 an n-bit field of Transport and logical fields and CRC. As can be seen at 914 the ARQoS 4-bit value which is the QoS Identifier on Read Address Channel, AWQoS 4-bit value which is the QoS Identifier on Write Address Channel have 3 bits that correspond to the 1-bit 908 CRF and 2-bit 910 prio bits.

Figure 10:
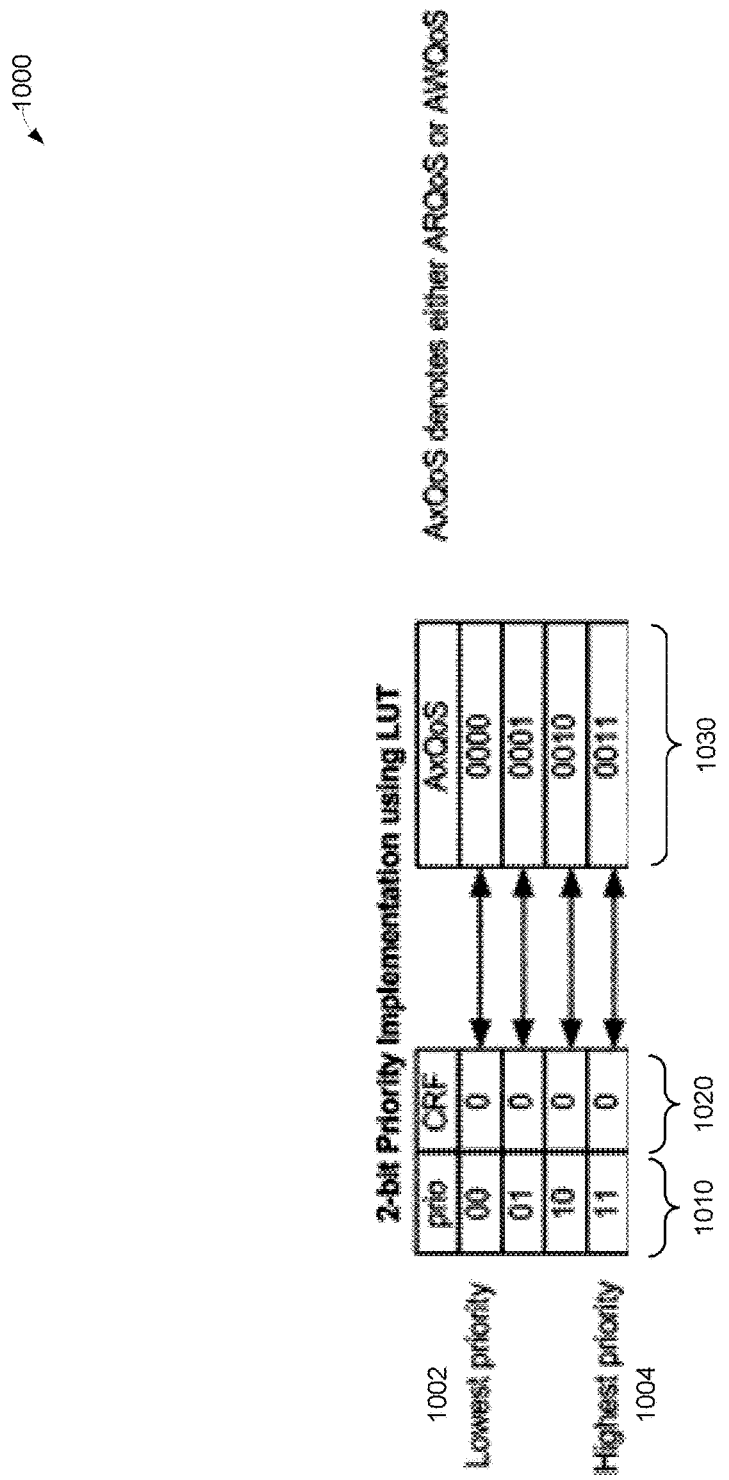
FIG. 10 illustrates, generally at 1000, one embodiment showing a 2-bit Priority Implementation using LUT.

FIG. 10 illustrates, generally at 1000, one embodiment showing a 2-bit Priority Implementation using LUT. At 1002 is Lowest priority, at 1004 Highest priority. In column 1010 is shown prio, and in column 1020 CRF, and in column 1030 the corresponding AxQoS. The AxQoS denotes either the ARQoS (read) or AWQoS (write) as is appropriate to the operation being performed.

Figure 11:
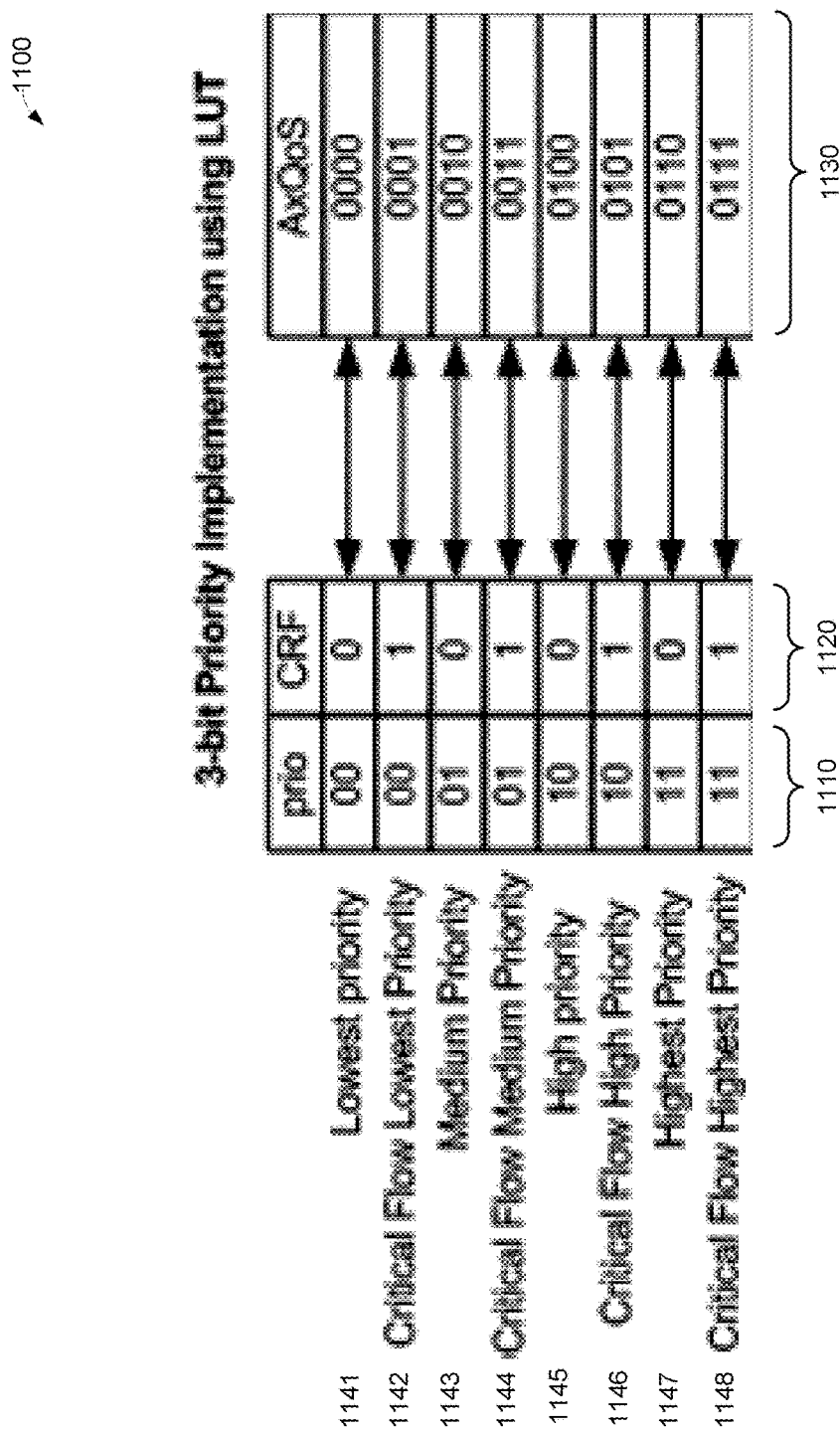
FIG. 11 illustrates, generally at 1100, one embodiment showing a 3-bit Priority Implementation using LUT.

FIG. 11 illustrates, generally at 1100, one embodiment showing a 3-bit Priority Implementation using LUT. At 1141 is Lowest Priority, through 1148 Critical Flow Highest Priority as shown (e.g. 1142, 1143, 1144, 1145, 1146, 1147). In column 1110 is shown prio, and in column 1120 CRF, and in column 1130 the corresponding AxQoS. The AxQoS denotes either the ARQoS (read) or AWQoS (write) as is appropriate to the operation being performed.

FIG. 9, FIG. 10, and FIG. 11 show mapping of the QoS field. The QoS field is used to identify the priority of the transactions. In one embodiment, 3-bit fields are used to allocate priority where the lowest value identifies the lowest priority and the highest value for the highest priority. In one embodiment AMBA ACE/AXI QoS (lowest 3-bit from 4-bit QoS) is mapped to 3-bit RapidIO tuple <CRF, PRIO>. In one embodiment Priority mapping is implemented using a LUT.

In one embodiment transaction mapping and flow for a read operation is disclosed. In one embodiment a Processing element needs a shared copy of cache-coherent data. Required Transactions are READ_HOME, RESPONSE (which is illustrated) and READ_OWNER (required for other scenarios not shown here). In one embodiment the PE is participating in coherency domain and not the home. In one embodiment the PE is participating in coherency domain, not the home, and home does not have the data; another PE currently owns the shared data. I one embodiment the Requesting PE is the home. In one embodiment the return data is always one CG-sized data payload.

Figure 12:
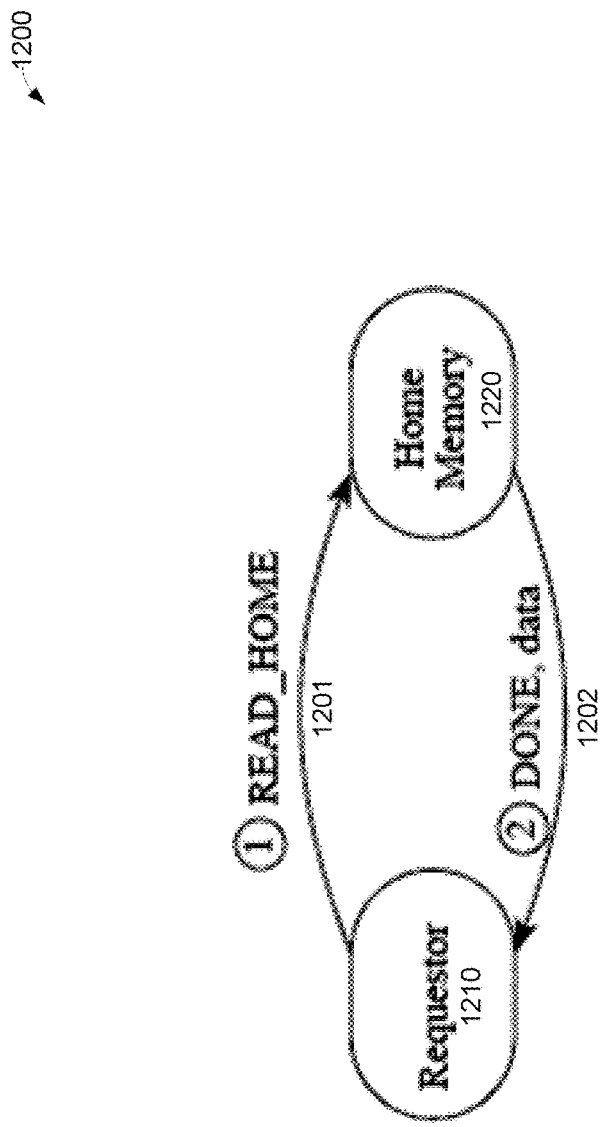
FIG. 12 illustrates, generally at 1200, one embodiment showing a Read operation to Remote modified CG.

FIG. 12 illustrates, generally at 1200, one embodiment showing a Read operation to Remote modified CG. At 1210 is the Request, at 1201 a ①READ_HOME, at 1220 Home Memory and at 1202 ②DONE, data. In the Data Read Operation in RapidIO as shown the Read operation is to a Remote shared CG. The Requested Data exists in memory directory as shared.

Figure 13:
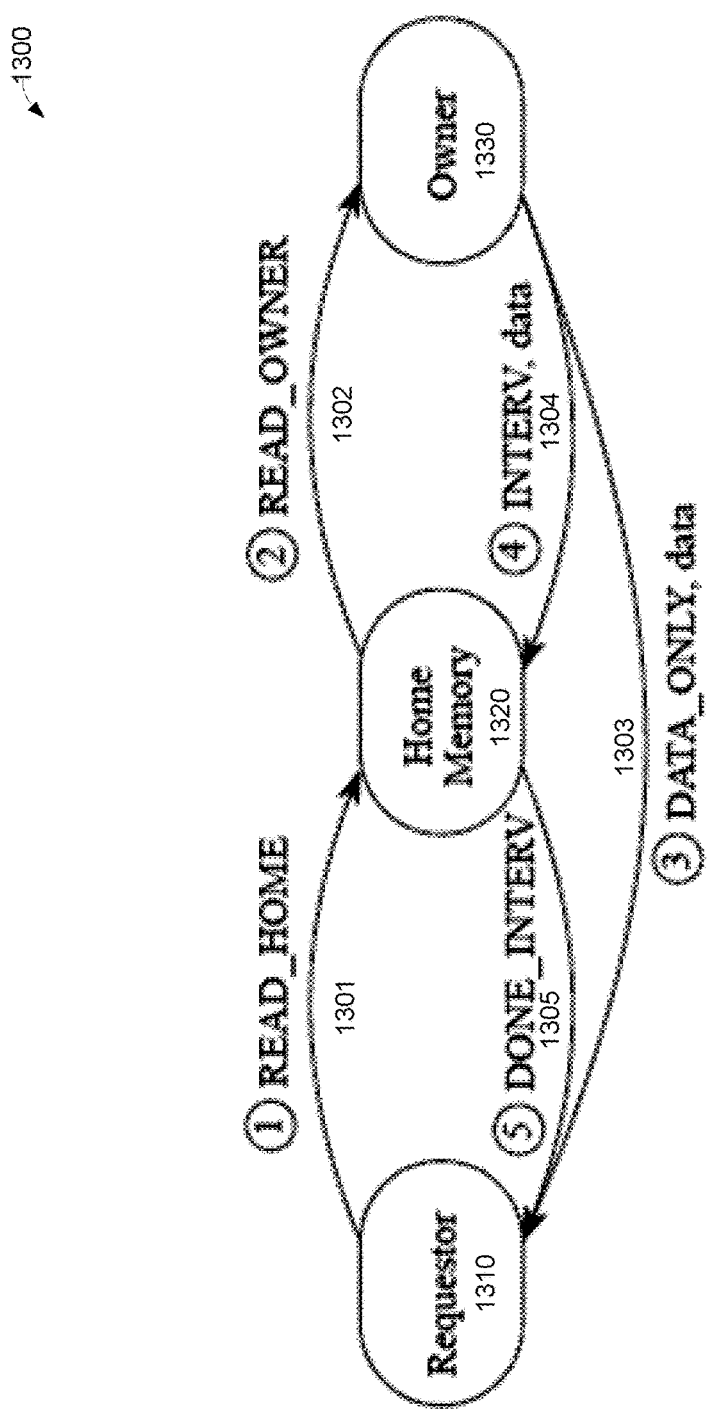
FIG. 13 illustrates, generally at 1300, one embodiment showing a Read operation to Remote shared CG (coherence granule).

FIG. 13 illustrates, generally at 1300, one embodiment showing a Read operation to Remote shared CG (coherence granule). At 1310 is the Request; at 1301 a ① READ_HOME; at 1320 Home Memory; at 1302 ②READ_OWNER; at 1330 Owner; at 1303 ③ DATA_ONLY, data; at 1304 ④ INTERV, data; and at 1305 ⑤ DONE_INTERV. In this embodiment, the Data Read Operations in RapidIO is a Read operation to Remote modified CG. The Requested data exists in the memory directory as modified. The Current data must be obtained from the owner. The Home memory needs to send READ_OWNER request to the PE that owns the CG.

Figure 14:
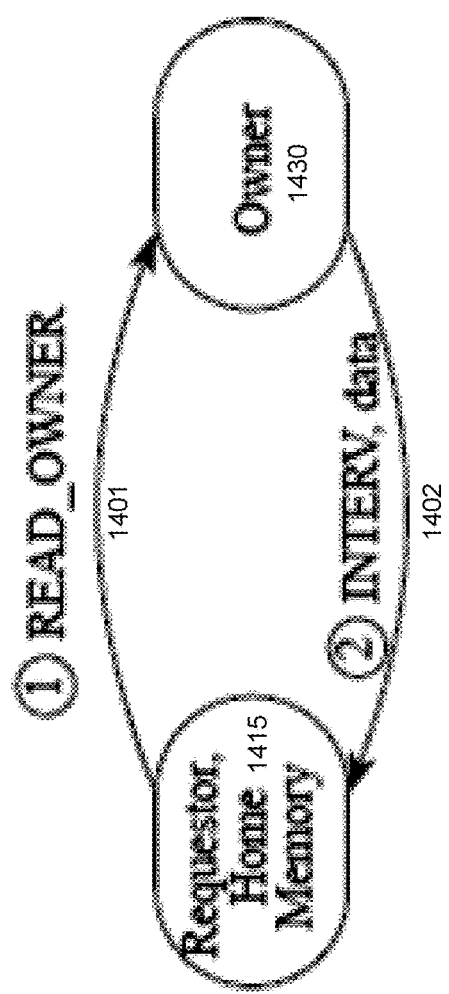
FIG. 14 illustrates, generally at 1400, one embodiment showing a Read operation to Local modified CG.

FIG. 14 illustrates, generally at 1400, one embodiment showing a Read operation to Local modified CG. At 1415 is Requestor, Home Memory at 1401 ① READ_OWNER, at 1430 Owner, at 1402 ② INTERV, data. In this embodiment, the Data Read Operations in RapidIO is a Read operation to Local modified CG. This embodiment is similar to that disclosed for FIG. 13, however the Requestor of CG is the home for the memory and does not need additional transactions (i.e., READ_HOME, DONE_INTERV).

Figure 15:
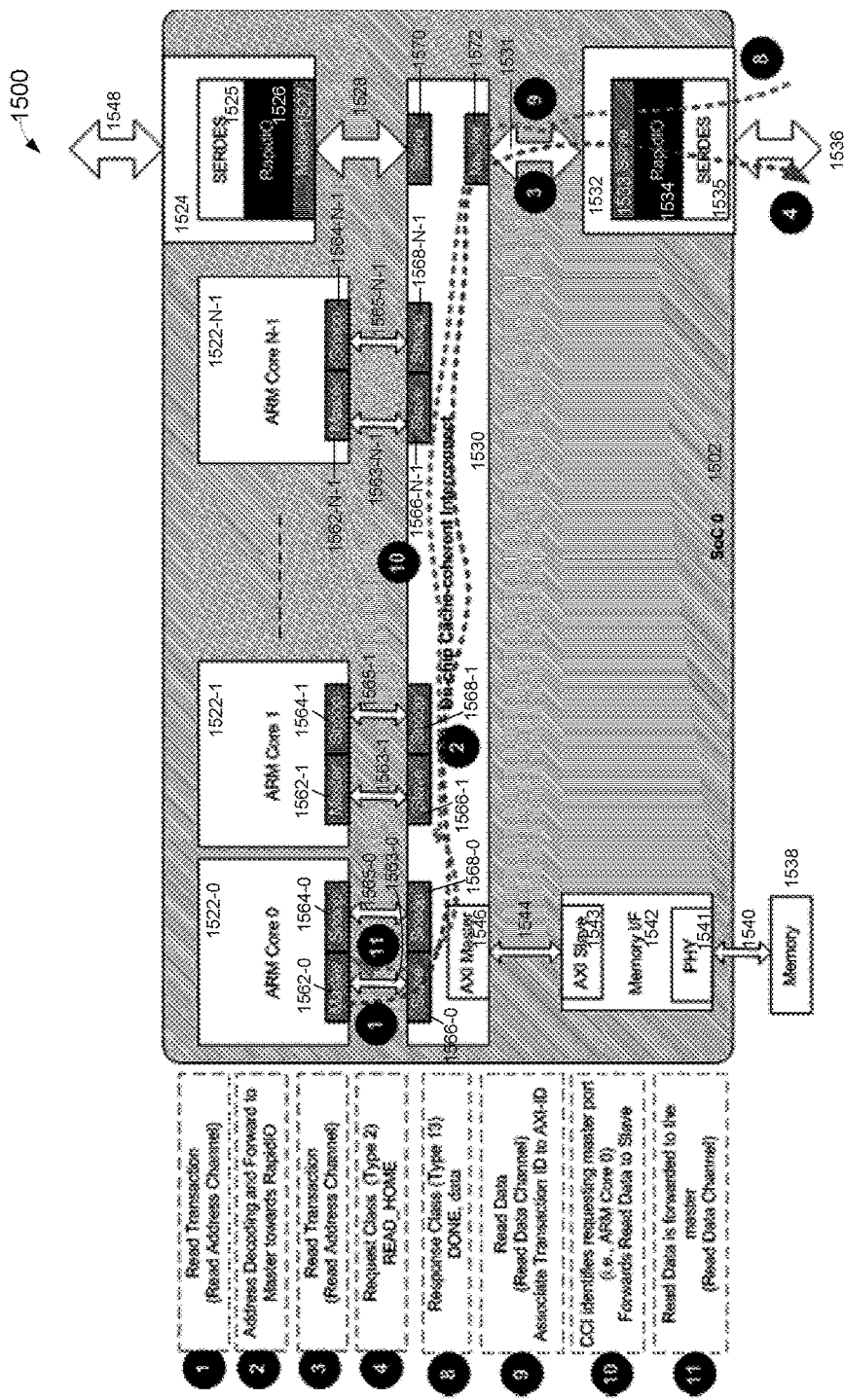
FIG. 15 illustrates, generally at 1500, one embodiment showing a Read Operation-Remote Shared (Requestor).

FIG. 15 illustrates, generally at 1500, one embodiment showing a Read Operation-Remote Shared (Requestor).

SoC 0 1502 is representative of one or more of FIG. 1 Processing Elements (e.g. PE 1 to PE N). SoC 0 1502 has a variety of interfaces including interface links 1540 to Memory 1538, 1536, and 1548.

SoC 0 202 has N ARM Cores as shown at 1522-0, 1522-1, . . . , 1522-N–1. Associated respectively with each ARM Core is Master 1562-0 and Snoop 1564-0, Master 1562-1 and Snoop 1564-1, . . . , Master 1562-N–1 and Snoop 1564-N–1. Master 1562-0 and Snoop 1564-0, Master 1562-1 and Snoop 1564-1, . . . , Master 1562-N–1 and Snoop 1564-N–1 are respectively in communication with link 1563-0 and 1565-0, and 1563-1 and 1565-1, . . . , 1563-N–1 and 1565-N–1. Links 1563-0 and 1565-0, and 1563-1 and 1565-1, . . . , 1563-N–1 and 1565-N–1 are respectively in communication with Slave 1566-0 and Snoop 1568-0, Slave 1566-1 and Snoop 1568-1, . . . , Slave 1566-N–1 and Snoop 1568-N–1. Slave 1566-0 and Snoop 1568-0, Slave 1566-1 and Snoop 1568-1, . . . , Slave 1566-N–1 and Snoop 1568-N–1 are part of On-chip Cache-coherent Interconnect 1530.

On-chip Cache-coherent Interconnect 1530 also has AXI Master 1546 which communicates with link 1544 to Memory I/F (InterFace) 1542. Memory I/F 1542 has an AXI Slave 1543 which communicates with link 1544. PHY 1541, which is part of Memory I/F 1542, communicates via link 1540 with Memory 1538. On-chip Cache-coherent Interconnect 1530 also has Slave 1570 which communicates with link 1528 to block 1524. Block 1524 has a Master 1527, a RapidIO 1526, and a SERDES 1525. Block 1524 can communication beyond SoC 0 1502 by using, for example, link 1548. On-chip Cache-coherent Interconnect 1530 also has Master 1572 which communicates with link 1531 to block 1532. Block 1532 has a Slave 1533, a RapidIO 1534, and a SERDES 1535. Block 1532 can communication beyond SoC 0 1502 by using, for example, link 1536.

As illustrated in FIG. 15 at the left hand side numbered 1, 2, 3, 4, 8, 9, 10, and 11 are transactions as noted. 1, 2, 3, 4 are the Read Transactions. At 8, 9, 10, 11 are the Response Transactions.

As illustrated in FIG. 15, in one embodiment the coherence granule (CG) size is 64-byte. However, the invention is not so limited and it is also possible to support other sizes. As illustrated in FIG. 15 the Read Operation-Remote Shared (Requestor), in one embodiment is CPU Core 0 in SoC 0 requesting data, the Read Transactions from AMBA ACE are mapped to RapidIO transactions, and in one embodiment, the specific transaction flow illustrated is implemented using a hardware based finite state machine (FSM).

Figure 16:
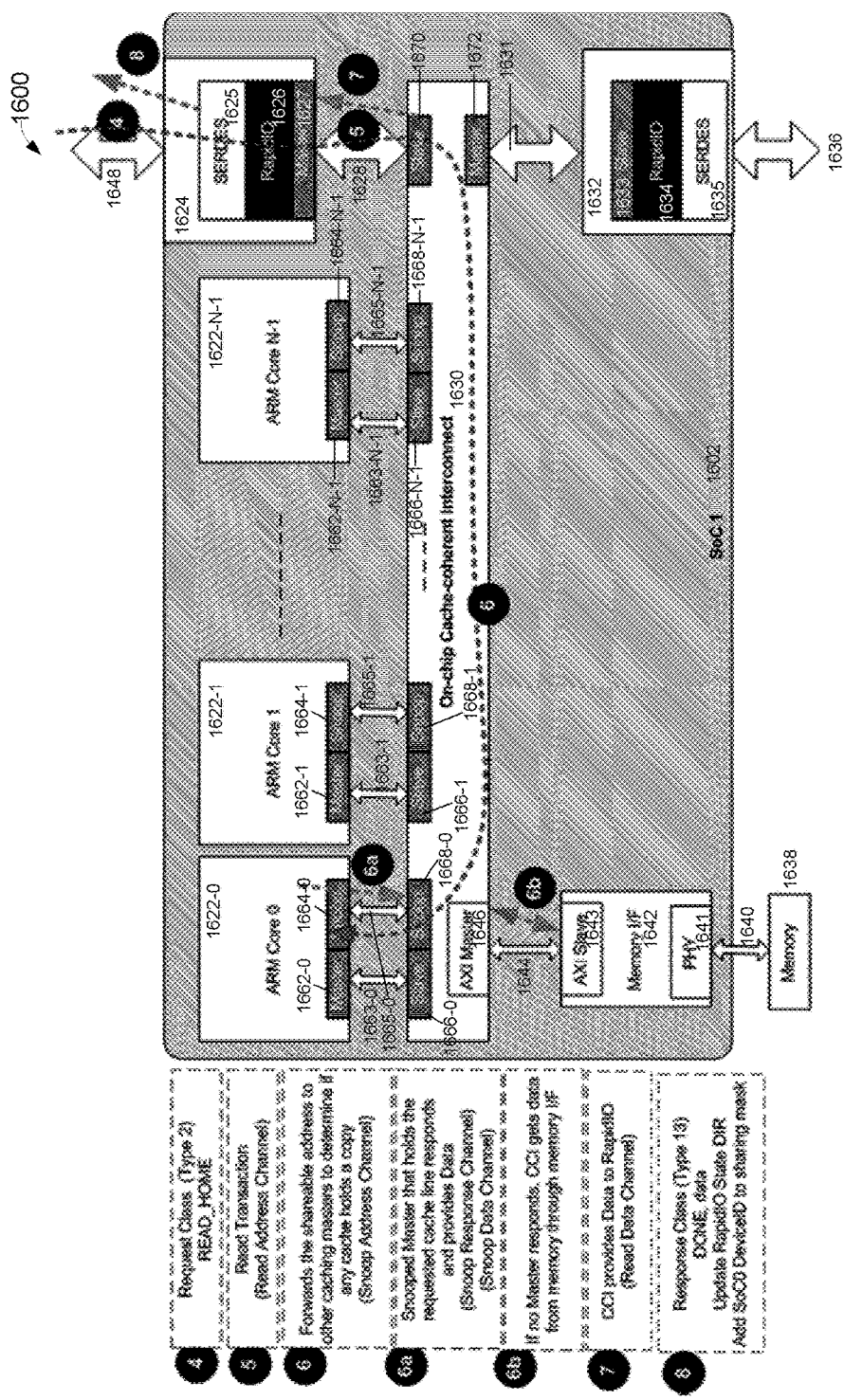
FIG. 16 illustrates, generally at 1600, one embodiment showing a Read Operation-Remote Shared (Home).

FIG. 16 illustrates, generally at 1600, one embodiment showing a Read Operation-Remote Shared (Home). SoC 1 1602 is representative of one or more of FIG. 1 Processing Elements (e.g. PE 1 to PE N). SoC 1 1602 has a variety of interfaces including interface links 1640 to Memory 1638, 1636, and 1648.

SoC 1 202 has N ARM Cores as shown at 1622-0, 1622-1, . . . , 1622-N–1. Associated respectively with each ARM Core is Master 1662-0 and Snoop 1664-0, Master 1662-1 and Snoop 1664-1, . . . , Master 1662-N–1 and Snoop 1664-N–1. Master 1662-0 and Snoop 1664-0, Master 1662-1 and Snoop 1664-1, . . . , Master 1662-N–1 and Snoop 1664-N–1 are respectively in communication with link 1663-0 and 1665-0, and 1663-1 and 1665-1, . . . , 1663-N–1 and 1665-N–1. Links 1663-0 and 1665-0, and 1663-1 and 1665-1, . . . , 1663-N–1 and 1665-N–1 are respectively in communication with Slave 1666-0 and Snoop 1668-0, Slave 1666-1 and Snoop 1668-1, . . . , Slave 1666-N–1 and Snoop 1668-N–1. Slave 1666-0 and Snoop 1668-0, Slave 1666-1 and Snoop 1668-1, . . . , Slave 1666-N–1 and Snoop 1668-N–1 are part of On-chip Cache-coherent Interconnect 1630.

On-chip Cache-coherent Interconnect 1630 also has AXI Master 1646 which communicates with link 1644 to Memory I/F (InterFace) 1642. Memory I/F 1642 has an AXI Slave 1643 which communicates with link 1644. PHY 1641, which is part of Memory I/F 1642, communicates via link 1640 with Memory 1638. On-chip Cache-coherent Interconnect 1630 also has Slave 1670 which communicates with link 1628 to block 1624. Block 1624 has a Master 1627, a RapidIO 1626, and a SERDES 1625. Block 1624 can communication beyond SoC 1 1602 by using, for example, link 1648. On-chip Cache-coherent Interconnect 1630 also has Master 1672 which communicates with link 1631 to block 1632. Block 1632 has a Slave 1633, a RapidIO 1634, and a SERDES 1635. Block 1632 can communication beyond SoC 1 1602 by using, for example, link 1636.

As illustrated in FIG. 16 at the left hand side numbered 4, 5, 6, 6a, 6b are transactions as noted for READ_HOME transactions. At 8, and 8 are the read data channel transactions.

As illustrated in FIG. 16, is one embodiment of the Read Operation-Remote Shared (Home). In one embodiment CPU Core 0 in SoC 1 or Home memory provides the data.

FIG. 17 illustrates, generally at 1700, a summary showing were embodiments are used. The summary shows ARM ACE to RapidIO Coherency Extension mapping and how the techniques disclosed can be used.

In one embodiment of the invention, a scale-out coherent and non-coherent multi-processing system is based on a dual directory implementation where the first directory is implemented within on-chip fabric for on-chip cores and the second directory keeps track of the on-chip participating processing elements.

In one embodiment of the invention, it utilizes the protocol mapping scheme and transaction flow discussed in the example Read mapping discussed.

In one embodiment of the invention, it applies a coherency mapping scheme for memory coherency applicable to both volatile and non-volatile memory.

In one embodiment of the invention, a same physical interconnect can be utilized for both coherent and non-coherent transactions by multiplexing coherent and non-coherent transactions over the same transport and physical layer functions.

In one embodiment of the invention, the ccoherency scheme can be implemented in distributed processing nodes or in a centralized fabric. For example, the ACE-RapidIO scale-out module can be implemented in each CPU or in a centralized switching fabric.

In one embodiment of the invention, we map AXI ID to transaction ID for coherency extension.

In one embodiment of the invention, we map ARM QoS to {prio,crf} fields.

In one embodiment of the invention, we extend coherency either by terminating the ARM coherent transactions or by encapsulating the coherent transactions over RapidIO coherent packets.

Thus Scalable Coherent Apparatus and Method has been described.

Because of the high speed embodiments the present invention requires specialized hardware.

As used in this description "GPU" or similar phrases, such as "Graphics Processing Unit" refers to specialized hardware that is not to be confused with a CPU (central processing unit). One skilled in the art understands that a GPU and CPU are different. For example, but not limited to, a GPU generally has specialized hardware for the efficient processing of pixels and polygons (image processing).

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a memory. These algorithmic descriptions and representations are used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate non-transitory physical quantities and are merely convenient labels applied to these quantities. Unless specifically stated otherwise as apparent from the discussion, it is appreciated that throughout the description, discussions utilizing terms such as "processing" or "calculating" or "determining" or "displaying" or the like, can refer to the action and processes of a specialized system, or similar electronic device, that manipulates and transforms data represented as physical (electronic) quantities within the specialized system's registers and memories into other data similarly represented as physical quantities within the specialized system memories or registers or other such information storage, transmission, or display devices.

An apparatus for performing the operations herein can implement the present invention. This apparatus is specially constructed for the required purposes. Such a specially constructed apparatus may store information in a non-transitory readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of non-transitory media suitable for storing electronic instructions either local to the specially constructed apparatus or remote to the specially constructed apparatus.

A specialized apparatus to perform the required methods is required. For example, any of the methods according to the present invention can be implemented in hard-wired circuitry specifically designed for the functionality disclosed, or by programming special hardware having, for example, in one embodiment, a particular machine such as a CPU specifically designed with a 16 bit or greater barrel shifter and a carry look ahead arithmetic logic unit. As disclosed Applicant submits that any results are tied to a particular machine or apparatus and/or transform a particular article into a different state or thing and that such particulars and/or things are non-trivial. For example, in FIG. 2 at 220 is a display. The results of the specialized machine may return an electronic value and such a value can be stored in hardware on the specialized machine and transformed into a graphical representation that can be displayed to a user of the specialized machine. For example, in one embodiment, the returned value may be stored as a group of physical electrons on a trapped gate of a flash memory device. These physical electrons may then be transformed into a graphical representation, for example, by twisting the molecules of a liquid crystal display so that a carrier signal can be modulated and produces on reception a molecular change in a rod and cone receptor of a human user to produce physical electrons thus producing a tangible useful result and transformation tied to a particular machine specifically designed, for example, with a 16 bit or greater barrel shifter and a carry look ahead arithmetic logic unit. For example the specialized hardware is required for logical operations and comparisons of values. For example, in one embodiment, the returned value may be stored as a series of holes on a paper tape that may be read by a person (e.g. a blind person) by tactile sensation (e.g. output from a KSR-33 Teletype). As disclosed Applicant submits that these results are tied to a particular machine or apparatus and/or transform a particular article into a different state or thing and that such particulars and/or things are non-trivial and as such satisfy Bilski.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a specialized machine, the expression of that technique may be more aptly and succinctly conveyed and communicated as a formula, algorithm, or mathematical expression. Thus, one of ordinary skill in the art would recognize a block denoting A+B=C as an additive function whose implementation in hardware would take two inputs (A and B) and produce a summation output (C). Thus, the use of formula, algorithm, or mathematical expression as descriptions is to be understood as having a physical embodiment in at least hardware (such as a specialized system in which the techniques of the present invention may be practiced as well as implemented as an embodiment).

A machine-readable medium is understood to include any non-transitory mechanism for storing or transmitting information in a form readable by a machine (e.g., a specialized machine). For example, a non-transitory machine-readable medium includes read only memory (ROM); random access memory (RAM); magnetic disk storage media; optical storage media; flash memory devices; devices having non-transitory storage.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding $2^5$ or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus while particular embodiments and applications of the present invention have been illustrated and described, it is to be understood that the invention is not limited to the precise construction and components disclosed herein. Various modifications, changes and variations which will be apparent to one of skill in the art may be made in the arrangement, operation and details of the method and apparatus of the present invention disclosed herein without departing from the spirit and scope of the invention as defined in the claims.

What is claimed is:

1. A transaction identification mapping for coherent RapidIO memory transactions between a plurality of external hardware processing elements comprising:
    for a Request Class Packet Type 2 encoding the 8-bit srcTID (source transaction identification) as a combination of bits from a 4-bit AXI ID (advanced extensible interface identification) and an 8-bit AXI ID; and
    for a Response Class Packet Type 13 decoding the targetTID (target transaction identification) into a combination of bits for a 4-bit AXI ID and an 8-bit AXI ID.

2. The transaction identification mapping of claim 1 wherein said decoding the targetTID into a combination of bits for a 4-bit AXI ID and an 8-bit AXI ID comprises the following mapping:
    targetTID bit 0 becomes 8-bit AXI ID bit 7;
    targetTID bit 1 becomes 8-bit AXI ID bit 6;
    targetTID bit 2 becomes 8-bit AXI ID bit 5;
    targetTID bit 3 becomes 8-bit AXI ID bit 4;
    targetTID bit 4 becomes 4-bit AXI ID bit 3;
    targetTID bit 5 becomes 4-bit AXI ID bit 2;
    targetTID bit 6 becomes 4-bit AXI ID bit 1;
    targetTID bit 7 becomes 4-bit AXI ID bit 0; and
wherein
    4-bit AXI ID bit 3 becomes 8-bit AXI ID bit 3;
    4-bit AXI ID bit 2 becomes 8-bit AXI ID bit 2;
    4-bit AXI ID bit 1 becomes 8-bit AXI ID bit 1;
    4-bit AXI ID bit 0 becomes 8-bit AXI ID bit 0.

3. The transaction identification mapping of claim 1 wherein said encoding the 8-bit srcTID as a combination of bits from a 4-bit AXI ID and an 8-bit AXI ID comprises the following mapping:
    8-bit AXI ID bit 7 becomes srcTID bit 0;
    8-bit AXI ID bit 6 becomes srcTID bit 1;
    8-bit AXI ID bit 5 becomes srcTID bit 2;
    8-bit AXI ID bit 4 becomes srcTID bit 3;
    4-bit AXI ID bit 3 becomes srcTID bit 4;
    4-bit AXI ID bit 2 becomes srcTID bit 5;
    4-bit AXI ID bit 1 becomes srcTID bit 6; and
    4-bit AXI ID bit 0 becomes srcTID bit 7.

4. The transaction identification mapping of claim 1 further comprising:
    mapping the lowest 3-bits from a 4-bit QoS (quality of service) to a 3-bit RapidIO tuple <CRF, PRIO> (critical request flow, priority).

5. The transaction identification mapping of claim 1 wherein the 4-bit QoS is a 4-bit ARQoS (read address channel quality of service) on a read address channel.

6. The transaction identification mapping of claim 1 wherein the 4-bit QoS is a 4-bit AWQoS (write address channel quality of service) on a write address channel.

7. The transaction identification mapping of claim 5 wherein the 4-bit QoS is a 4-bit AWQoS on a write address channel.

8. The transaction identification mapping of claim 7 wherein the 4-bit QoS to a 3-bit RapidIO tuple <CRF, PRIO> is as follows where AxQoS (AxQoS denotes either the ARQoS (read) or AWQoS (write) as is appropriate to the operation being performed) is selected from the group consisting of ARQoS and AWQoS:
    AxQoS of 0000 becomes PRIO of 00 and CRF of 0;
    AxQoS of 0001 becomes PRIO of 01 and CRF of 0;
    AxQoS of 0010 becomes PRIO of 10 and CRF of 0; and
    AxQoS of 0011 becomes PRIO of 11 and CRF of 0.

9. The transaction identification mapping of claim 7 wherein the 4-bit QoS to a 3-bit RapidIO tuple <CRF, PRIO> is as follows where AxQoS is selected from the group consisting of ARQoS and AWQoS:

AxQoS of 0000 becomes PRIO of 00 and CRF of 0;
   AxQoS of 0001 becomes PRIO of 00 and CRF of 1;
   AxQoS of 0010 becomes PRIO of 01 and CRF of 0;
   AxQoS of 0011 becomes PRIO of 01 and CRF of 1;
   AxQoS of 0100 becomes PRIO of 10 and CRF of 0;
   AxQoS of 0101 becomes PRIO of 10 and CRF of 1;
   AxQoS of 0110 becomes PRIO of 11 and CRF of 0; and
   AxQoS of 0111 becomes PRIO of 11 and CRF of 1.

* * * * *